United States Patent Office 3,141,263
Patented July 21, 1964

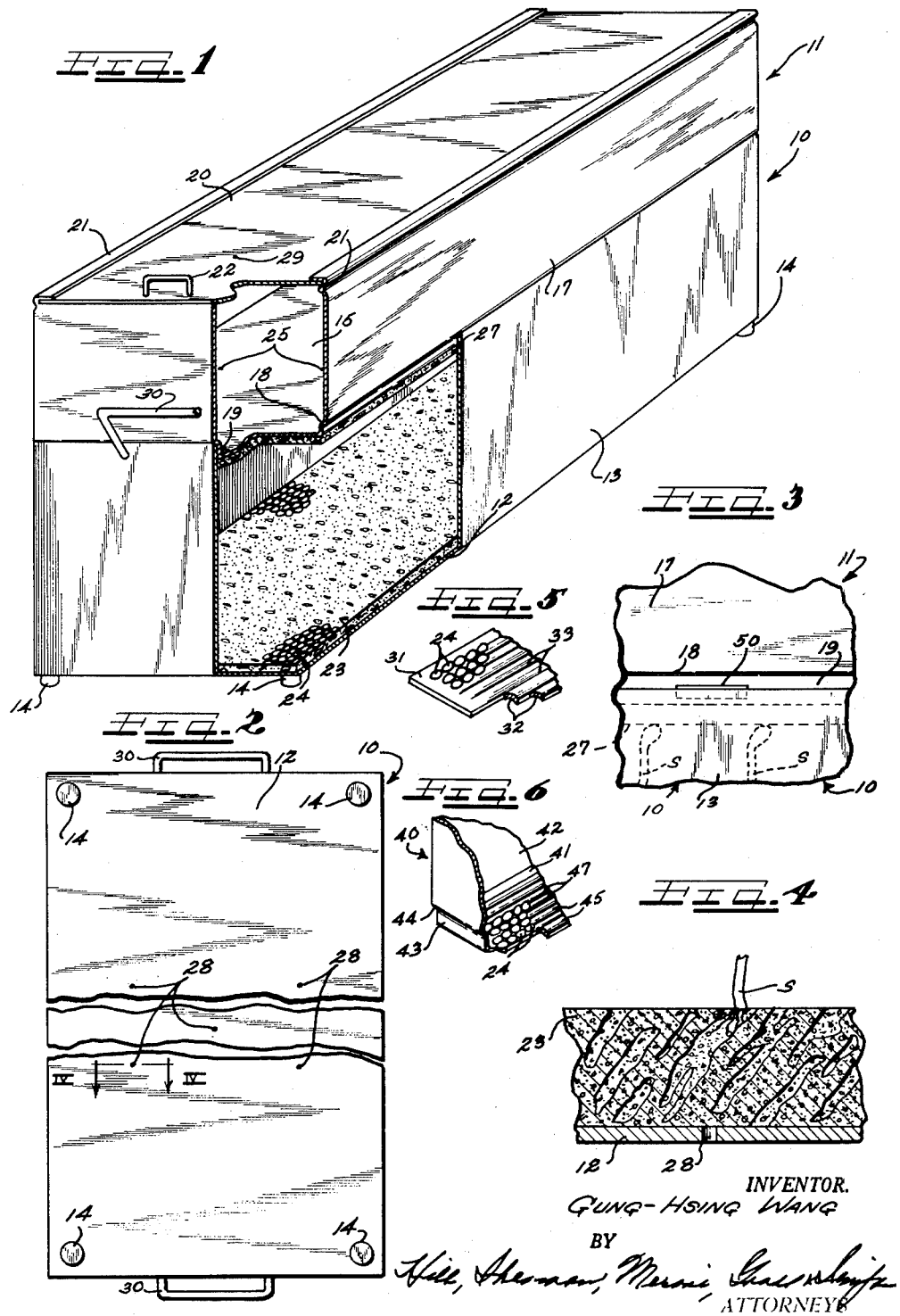

3,141,263
METHOD AND MEANS FOR GROWING EDIBLE
BEAN AND LIKE SPROUTS
Gung-Hsing Wang, 8200 S. Indiana Ave.,
Chicago 19, Ill.
Filed May 15, 1961, Ser. No. 109,949
7 Claims. (Cl. 47—14)

The present invention relates to improvements in the growing of edible bean and like sprouts, and more particularly concerns a method of and means for growing such sprouts in a convenient, efficient and substantially foolproof manner.

Bean sprouts are customarily grown commercially and then distributed to users such as restaurants, canneries, and the like, but there is a loss of quality both as to texture and nutritional value in bean sprouts unless they are used immediately upon removal from the growing beds. Ideally the user should grow the sprouts directly for immediate consumption at the end of the growing period. Such sprouts have a crispness, excellence of flavor and nutritional value that cannot be matched by commercially grown and transported or canned sprouts.

In spite of the clear desirability of direct consumer growing of bean and like sprouts, most consumers are, especially in non-oriental countries, either inexperienced in growing such sprouts or are not inclined to employ the customary, rather elementary and age-old method employed by and derived from people of oriental background, and requiring fairly frequent and particular attention during the growing period. On the other hand, in view of their nutritional value and gustatory excellence leguminous sprouts deserve wider usage than has been prevalent among people of non-oriental background.

It is therefore an important object of the present invention to provide new and improved method and means for growing edible bean and like sprouts in an appealingly simple, convenient and virtually foolproof manner enabling persons wholly lacking in experience to grow sprouts of the highest quality.

Another object of the invention is to provide an improved method of and means for growing edible leguminous sprouts which entirely eliminates the prior practice which required opening of the sprouting chamber or receptacle several times a day to sprinkle water on the legumes during their sprout-growing period.

A further object of the invention is to provide a new and improved method and means for growing leguminous sprouts under at least close to ideal conditions in respect to total darkness, moisture and ventilation throughout the growing period.

Still another object of the invention is to provide a method of and means for growing leguminous sprouts especially suitable for domestic practice and use and productive of superior results in the quality of sprouts grown.

Yet another object of the invention is to provide an improved method of and means for growing leguminous sprouts for edible purposes and according to which the sprouts themselves actuate a signal automatically signifying the termination of the optimum growing period for the sprouts.

Other objects, features and advantages of the present invention will be readily apparent from the following detailed description of a preferred embodiment thereof taken in conjunction with the accompanying drawing, in which:

FIGURE 1 is a perspective view, partially broken away and in section, showing a device embodying features of the present invention;

FIGURE 2 is a fragmental bottom plan view of the device of FIGURE 1;

FIGURE 3 is a fragmentary side elevational view of the device of FIGURE 1 showing, on an enlarged scale, the juncture between the wall of the growing tray and of the water dispenser, demonstrating a desirable form of sprout growth termination signal;

FIGURE 4 is an enlarged fragmentary sectional detail view of the bottom of the growing tray and the sprouting base member carried thereby;

FIGURE 5 is a fragmentary perspective sectional view of a modified form of sprouting base member; and FIGURE 6 is a fragmentary sectional elevational view of an auxiliary sprouting tray for use with the principal or main sprouting tray where multi-layer growing of sprouts is desired.

Ideally, leguminous sprouts for edible purposes should be grown in total darkness in order to assure optimum quality of texture and succulence and uninterrupted uniformity of growth without tendency toward manufacture of chlorophyll which begins to develop on even momentary exposure of the sprouts to light. Further, the space within which the sprouts are growing should have as nearly as practicable constant moisture conditions in its atmosphere without fluctuation from a saturated atmosphere to the termination of growth, together with as nearly as practicable constancy of temperature. All of these desirable ends are attained according to my method as practiced with the exemplary device illustrated in the drawing and comprising a growing chamber container or tray 10 and a separably superimposed water dispenser tray 11. While these members may be of any preferred shape and capacity, they are shown in a substantially rectangular shape and size well suited for domestic use for convenient disposition in or adjacent a kitchen sink, for example, and for growing a crop of sprouts suitable for average family use. Such a unit may be about ten inches long by four inches wide. This size is especially suitable for growing plentiful crops of mung bean sprouts for household purposes, although other types of legumes may also be processed for sprouting, such as soybeans, peas and other legumes.

Any suitable opaque material may be used for the tray members 10 and 11, among which may be mentioned metal, wood, synthetic plastic, ceramic, waterproof paper carton material, papier-mache, glass treated to be perfectly opaque, etc. In one practical form a heavy grade of aluminum foil lends itself well for this purpose and lends itself well to low cost mass production stamping and shaping of the tray members.

As to the growing tray 10, it has a horizontal bottom 12 and integral side walls 13 providing a growing chamber which is entirely closed except at the top of the tray where the walls provide a top edge in a horizontal plane parallel with the bottom 12. In order to maintain the bottom 12 elevated to a limited extent above a supporting surface respective small knob-like supports 14 are carried by the underside of the bottom 12 adjacent to the opposite corners thereof. These supports 14 may be of any satisfactory material having a low heat transfer rate and desirably insulating function, such as suitable rubber or plastic, and which may be easily and effectively permanently secured to the bottom 12 adhesively or by some mechanical connection such as riveting or the like.

The water dispenser tray 11 may be constructed of similar material as that used for the growing tray 10 and is provided with a bottom wall 15 and side walls 17 integral therewith and continuous thereabout. At the lower ends of the upstanding walls 17 they are inset to provide a rabbet affording a seat 18 which is engageable upon the upper edge defined by the growing tray walls 13, with an inset narrow vertical wall portion 19 below the seat telescopically engageable within the upper margin of the walls 13 to retain the tray 11 against horizontal displacement from vertically aligned assembly with the growing tray 10.

Although the top of the water dispenser tray 11 may be left open, it is preferred to provide the same with a closure 20 conveniently in the form of a longitudinally slidable plate, the longitudinal edges of which are slidably engaged within suitably formed runners or inwardly opening channel tracks 21 formed integrally on the upper margins of the longitudinal walls 17 of the water dispenser tray. One or both of the upper edges of the end walls of the tray member 11 are in a plane with the lower supporting surfaces of the channels 21 to engage slidably with the underside of the cover slide 20. For convenience in manipulating the cover slide 20 to open and close the top of the tray 11, a handle 22 may be provided on the cover preferably adjacent one end thereof.

In using the present sprout grower, a removable sprouting base 23 is placed on the upper surface of the tray bottom 12 within the growing chamber of the growing tray 10 and a uniform layer of the preferred legume seeds 24 is placed upon the upper surface of the growing base. In a desirable form, the growing base 23 comprises a layer or panel of suitable sponge material of the interconnected cell type, either natural or synthetic and with predominantly fine cells although there may be as in the illustrated example some larger cells or discontinuous passages in the sponge. Such sponge material is advantageous because it will hold a large volume of water to encourage or force sprouting of the legumes and growth of the sprouts. Yet, as the sprouts grow, the predominantly minute cellular structure of the sponge while permitting shallow penetration of roots of each sprout S as shown in FIG. 4 and thus water absorption from the water filled sponge, discourages growth of the sprout roots to any depth, both by lack of nutrient value in the sponge and by difficulty of penetration into the sponge by the roots. Therefore, growth energy is largely concentrated in the sprout stem where it is desired. The sprouting base 23 should be dimensioned to cover the growing tray bottom 12 substantially entirely, and the layer of legume seeds 24 such as mung beans should cover the entire upper surface of the sprouting base 23 and preferably without overlapping or standing one on the other, but with the beans just touching one another adjacently in the layer.

After the water pervious sprouting base 23 and the legumes 24 have been placed within the growing tray 10, the water distribution tray 11 is mounted on the top of the tray 10 as shown in FIG. 1, thereby serving as a complete closure for the chamber within the growing tray 10 and entirely shutting off all light into the growing chamber and placing the same in total darkness.

According to the present invention, the growing chamber within the growing tray 10 is never opened until the sprouts developing from the legumes 24 are fully grown. To this end, water is filled into the dispenser tray 11 and slowly drips therefrom through a plurality of pin holes 25 in the bottom 15. There may, for example, in a ten by fourteen inch tray be five of the drip holes 25 uniformly disposed on the bottom 15, two of the holes being adjacent each of the respective ends of the bottom and one in the center. A suitable size for the pin holes is not larger than $\frac{1}{32}''$ in diameter for mung beans, while for larger legumes such as soybeans larger size holes for more rapid drainage are desirable.

Improved water distribution and insulation against disturbing the temperature within the growing chamber, from cold water deposited from time-to-time in the water dispensing tray 11, is afforded by a roof or ceiling sponge layer 27 attached to the underside of the tray bottom 15 and into which the water leaving the tray 11 through the dispensing holes 25 is distributed uniformly over the top of the growing chamber by the normal capillary distribution of water through the sponge layer 27. By gravity water drips down from the saturated sponge 27 onto the legumes 24 and the sprouting base 23.

Since it is highly desirable to avoid stagnation of any water in the growing tray 10, but it is actually advantageous to have a slight drainage, not only to avoid fermentation within the growing chamber, but also to afford ventilation, the bottom 12 of the growing tray 10 is provided with drainage holes 28 (FIGS. 2 and 4) which are desirably equal in number and size to the dispenser holes 25 in the water tray bottom 15. By having the sets of holes 25 and 28 substantially equal in number and distribution and size, it will be clear that as long as the drainage holes 28 are unobstructed there can never be accumulation and stagnation of surplus water in the growing tray 10. Clogging of the drainage holes 28 in the bottom 12 is virtually precluded by the sprouting base 23 interposed between the holes and the layer of sprouting legumes. Since the bottom 12 is maintained in spaced relation above a supporting surface by the supports 14 there is always freedom for drainage from the holes 28 into the space below the bottom 12.

Where the cover 20 is used, as is desirable to avoid contamination of the body of water in the water distribution tray 11, a small air hole 29 of pin hole size or about $\frac{1}{32}$ of an inch in diameter is provided at a suitable location through the cover. This will assure sufficient air relief into the water chamber in the tray 11 to enable slow seepage of water through the dispensing holes 25 in the tray bottom 15.

For convenience in handling the sprout growing unit, handle means are provided on the growing tray section 10. A pair of suitable handles 30 may be provided, one attached to each of the opposite ends of the tray 10. By having the handles 30 of a construction, such as the generally inverted U-shape shown, on the upper margin of the respective end wall portions of the tray 10 and projecting outwardly and upwardly above the top edge of the tray and opposing the respective end wall portions of the upper tray section 11, the handles serve as protectors against endwise displacement of the upper tray relative to the lower tray. Further, by having the handles 30 on the upper end portion of the tray 10, and generally aligned with the lower portion of the water dispensing upper tray section 11 wherein the weight of the body of water in the tray 11 is concentrated, the handles are well above the center of mass of the unit, and thus further facilitate handling the unit without danger of tipping.

Satisfactory results can also be attained by the use of a sprouting base 31 (FIG. 5) constructed as a perforated panel made from a self-sustaining material such as sheet metal, heavy metal foil such as aluminum foil, a hardenable plastic, and the like. Such a panel member may be molded or stamped into shape and may possibly be fabricated at a lower cost than a sponge type sprouting base such as the sprouting base 23. In a desirable form, the sprouting base 31 comprises an essentially flat panel dimensioned to fit loosely within the bottom of the sprouting tray 10. About its perimeter, the sprouting base panel 31 is solid for proper maintenance of its self-sustaining characteristics. At suitable spaced parallel intervals the sprouting base panel 31 is provided with shallow, that is, low height, divider ribs 32 projecting up from the upper face of the panel and spaced apart just sufficiently to afford therebetween elongated depressions or grooves receptive of rows of the legumes 24, with the rows closely enough spaced to have the legumes in close side-by-side relation to afford substantially maximum coverage of the sprouting base panel 31 with the legumes when fully loaded. Between the divider ribs 32 and in the bottoms of the respective depressions or grooves between the ribs are provided respective drainage perforations 33 which are conveniently in the form of slits on the order of $\frac{1}{64}$ or less width, but may be in the form of series of individual pin holes on the same order of dimensions as mentioned for the slits. Whereas the ribs 32 are shown as extending longitudinally, they may, of course, extend transversely or diagonally, as preferred. An effect of the ribs 32 is, of course, to reinforce the sprouting base panel 31 against undue tendency toward bending and thus enable the use of quite thin and inexpensive material in making the sprouting base panel 31.

A multi-layer sprouting arrangement may be provided by furnishing additional growing trays 40 (FIG. 6) which may be a hybrid construction embodying as an auxiliary attachment features of both the growing tray 10 and the water dispenser tray 11.

Hence, the auxiliary tray 40 has a generally flat bottom 41 and integral upstanding wall structure 42 provided at the lower end portion thereof adjacent juncture with the bottom or floor panel 41 with an inset 43 telescopically engageable within the upper end portion of the wall 13 of the lower tray 10, a downwardly facing shoulder 44 defining the upper limit of the inset and arranged to rest upon the upper edge of the lower tray wall 13 and support the auxiliary tray 40 firmly thereon. In height, of course, the tray wall 42 should be the same as the height of the growing tray wall 13, related to the type of legumes to be grown in the unit. On its upper edge, the wall 42 is adapted to receive and support the water dispenser tray 11 or another auxiliary growing tray, as preferred.

While the auxiliary tray bottom panel 41 may be constructed similarly as the growing tray bottom 12, with drainage perforations therein and over which a sponge type sprouting base may be placed, such bottom panel 41 may be constructed similarly as the sprouting base panel 31. That is, a plurality of parallel separator ribs 45 are adapted to be provided, suitably formed on the bottom panel 41 to separate rows of the legumes 24, with corresponding grooves or depressions between the ribs 24 provided with slit or individual type perforations 47.

After the sprout forcing and growing unit has been loaded with the layer of legumes 24 in the individual growing tray 10 or in each of a plurality of the growing trays in a multi-layer arrangement, and whether the sponge type growing base 23 or the perforated, rib panel type base 31 or 41 is utilized, and the water dispenser tray 11 has been installed, all that need be done until the bean sprouts S have reached maturity, is to fill the water dispenser tray 11 with water and keep it supplied with water reasonably continuously, although slight gaps or intervals in such filling after the tray has run empty, after a saturated atmosphere has been established within the growing tray, will not prove detrimental. Continual pitch darkness is maintained in the growing tray compartment, evaporation is precluded from such compartment, and temperature differentials are substantially avoided, all of which are desirable environmental factors in efficient sprout forcing and culture. Further, since it is unnecessary ever to open the growing compartment until the sprouts have reached maturity, the normal heat developed by the growing sprouts is conserved in the compartment and thus contributes to the speed and efficiency of forcing growth.

A desirable thickness in the sponge type sprouting base 23 has been found to be about one-half inch. This assures maintenance of a substantial amount of water distributed throughout the sprouting base and available by capillary action to the rootlets of the growing sprouts S which, because of the extremely tortuous nature of the intercellular connections and the unnutritive nature of the material of the sprouting base are substantially inhibited in their growing rate and length and number so that they will penetrate to only a very limited extent into the upper portion of the thickness of the sprouting base sufficient to absorb water for growth of the respective sprouts S but without detracting essentially from the growth energy of the stems of the sprouts. This is also true in respect to the growing bases 31 and 41 of FIGURES 5 and 6, respectively, which, although they do not present an interstitial porosity as the sponge type sprouting base, provide small aperture openings in the respective sprouting base plates under the legumes 24 which are controlled to overlie such perforations so that the hair-like rootlets of the developing sprouts seeking an anchorage pass to a limited extent through the perforations and finding nothing of nutrient value therebeyond remain in a vesigial condition while the growth energy is retained in the stems of the sprouts. As a result of the discouragement of any substantial root growth and thus expenditure of growth energy into the roots, improved thickness and succulence develops in the sprout stems. Nevertheless, there is sufficient root development to afford adequate anchorage and upright growth of the developing sprouts as is desirable for optimum stem growth.

Since for best flavor and succulence, the sprouts should grow only to a length which will consume the body of the parent legume, it is highly desirable to restrict the growth height to the optimum for the particular legume being sprouted. For mung beans, for example, the critical height for best over-all characteristics and flavor of the sprouts at maturity is about three to three and one-half inches. Accordingly, for mung beans, the space afforded between the upper surface of the sprouting base 23, or 31, or 41, as the case may be, and the lower surface of the closure for the growing chamber is predetermined to be not in excess of three and one-half inches but not less than three inches. When the crowns of the sprouts S reach and thrust against the ceiling surface defining the sprouting chamber, as for example the water distribution and filter sponge 27 providing the ceiling of the chamber within the growing tray 10 in FIGURE 1, growth in height or length of the sprouts is inhibited and any additional growth energy derived from the parent legume goes into thickening of the stem.

Since it is highly desirable to harvest and take advantage of the optimum gustatory excellence of the bean sprouts promptly upon their reaching maturity, and since there is no visual access into the growing chamber for gauging the degree of maturation of the sprouts, means have been provided for operation of a signalling device by the bean sprouts themselves. Herein this is accomplished by the arrangement whereby the bean sprouts as they reach maturity literally raise the roof of the sprouting chamber. This is possible because the aggregate thrust of the multitude of growing sprouts is sufficient to overcome the moderate weight of the water distribution tray 11 constructed of light enough material in relation to the aggregate sprout thrust to enable lifting of the tray by the sprouts.

Under ideal bean sprout growing temperatures of 80 to 85° F., it takes about 96 to 120 hours for mung bean sprouts to attain maturity. At normal room temperature it may take a little longer. With this in mind, as the end of the growing term approaches, supplying of water to the water distribution tray 11 may be discontinued so that all or most of the weight of water in the water distribution tray will have been spent by the time the grown bean sprouts thrust against the underside of the tray by the heads of the sprouts shouldering against the lower face of the roof sponge 27. Because this sponge is an insulator, and because the sponge has been continuously subjected to the growing temperature within the growing chamber, there is complete freedom from temperature differential shock when the bean sprout heads engage the underside of the roof sponge 27. Then, as the sprouts S continue to grow after initial contact with the growing chamber roof, they gradually lift the water distribution tray 11 upwardly until a visible gap exists between the supporting shoulder 18 and the top edge of the growing tray wall 11. This of itself serves as a visible indicator. However, a further visible signal or indicator 50 (FIG. 3) is preferably provided on one or more of the inset vertical wall portions 19 under the shoulder 18 to become visible as the tray 11 is raised by the bean sprouts thrusting upwardly thereagainst, as schematically indicated by two of the bean sprouts S, representative of the entire multitude of bean sprouts. The indicator 50 may be in the form of a design or a color spot, or the like which will attract visual attention thereto and thus signal the attainment of ripeness or maturity of the sprouts.

It will be appreciated that as the tray 11 is being lifted by the bean sprouts, any tendency toward leakage of light over the top of the tray wall 13 past the inset wall 19 into the growing chamber is blocked by the roof sponge 27 distended with moisture and contacting the inside of the tray wall 13 as a light-excluding seal. Additionally, the sponge 27 serves at its edge contacting the wall 13 as a weather strip or seal against air leakage into the growing chamber or escape of the humid atmosphere within the growing chamber until the closure and water distribution tray 11 is deliberately lifted away from the growing tray therebeneath for removal of the mature, fully grown sprouts. Up until the moment the upper tray 11 is removed for opening the growing chamber, the ideal saturated, filtered air atmosphere is maintained in the growing chamber.

After the growing chamber within the tray 10, or within the auxiliary tray 40 has been opened at the conclusion of sprout growth, the sprouts are removed for use. In the case of the sprouting base 23 or the base 31, it is removed from the tray 11 with the sprouts anchored thereto and the seed coats which remain in and on the sprouts but free therefrom are, if desired, shaken loose or are washed from the mass of sprouts. This cleansing of the mass of sprouts of the seed coats is greatly facilitated by virtue of the anchorage of the sprouts to the sprouting base 23, or the sprouting base 31, or for that matter the sprouting base provided by the auxiliary tray bottom 41, since the entire mass of sprouts can be inverted. The sprouts as attached to the sprouting base can be swished through water in a tub or basin and the seed coats floated off. This may be effected in an inverted position or in an upright position of the sprouting base. Removal of the seed coats may also be effected by holding the sprouting base with the attached sprouts under a gentle kitchen spray to float the seed coats away. In this cleansing of the sprouts of seed coats, anchorage of the sprouts through their rootlets to the sprouting base facilitates the cleansing action.

After the seed coats have been cleaned from the mass of sprouts, the sprouts are easily pulled free from the sprouting base, and the roots that remain on the sprouts are perfectly edible with the stems and heads of the sprouts.

In fact, the seed coats, though lacking the attractive appearance of the sprouts, are nevertheless edible, and many persons do not remove the seed coats from the mass of sprouts but consume them with the sprouts, primarily for roughage.

It will be understood that modifications and variations may be effected without departing from the scope of the novel concepts of the present invention.

I claim as my invention:

1. In a device for growing edible leguminous sprouts, means defining a growing chamber, a sprouting base in the bottom of said chamber adapted to receive a layer of legumes to be sprouted, said sprouting chamber having a top providing a water receptacle, means for introducing water from said receptacle into said chamber comprising a plurality of drip holes in the bottom of said receptacle, and a filtering and water distribution member mounted on the underside of said receptacle bottom within said growing chamber.

2. In a device for growing edible leguminous sprouts, means defining a growing chamber, a sprouting base in the bottom of said chamber adapted to receive a layer of legumes to be sprouted, said sprouting chamber having a top providing a water receptacle, means for introducing water from said receptacle into said chamber comprising a plurality of drip holes in the bottom of said receptacle, and a layer of insulating material possessed of interconnected porosity disposed adjacent to the underside of said receptacle bottom and receptive of the water escaping through said drip holes toward said chamber and functioning to distribute the water and assist in maintaining a saturated humid atmosphere in the chamber.

3. In a device for growing edible leguminous sprouts, a growing tray opening upwardly, said growing tray having a sprouting base therein, a combination closure and water distribution tray having a base end portion telescopically removably engageable on the upper end portion of said growing tray, the bottom of said closure and water distribution tray having a series of small drip holes therein for distribution of water from within the closure and distribution tray into said chamber, and a layer of insulating and water distribution material attached to the underside of said bottom of the closure and water distribution tray and serving as a water and air filter across said drip holes.

4. In a device for growing edible leguminous sprouts, a sprout growing tray defining a sprout growing chamber opening upwardly, a water distribution and closure tray engageable upon the top of the growing tray and defining a receptacle for water, drip holes through the bottom of said receptacle into the water growing chamber in the growing tray, drain holes in the bottom of the growing tray equal in number and size to the drip holes, a layer of insulating and filter material on said growing tray bottom over the drain holes and providing a growing base receptive of a layer of legumes to be sprouted, and a layer of insulating and filtering material attached to the bottom of said closure and water distribution tray across the drip openings, said last mentioned layer being marginally engageable with said growing tray and serving as a seal at the joint between the trays.

5. In a device for forcing the growth of edible sprouts of legumes, means defining a sprout growing chamber having a roof and a bottom wall each provided with limited flow area holes therethrough and the chamber being otherwise light-tight, said holes being for the purpose of admitting water into the chamber through the roof and drainage of water from the chamber freely through the bottom wall, a layer of material having sponge characteristics overlying the bottom wall and adapted to support legumes to be sprouted, and a second layer of material having sponge characteristics within the chamber between said roof and the first mentioned layer and disposed to overlie the legumes, said layers sealing the interior of the chamber against light leakage through said holes as well as providing insulation and providing for water carrying and distribution for high humidity within the chamber to promote sprout growth.

6. In a device for forcing the growth of edible sprouts of legumes and including a chamber having a bottom wall with drainage means and a roof with means for supplying water into the chamber; means over said bottom wall providing a growing base to support a mass of legumes to be sprouted; and a member having sponge characteristics dimensioned to afford a light-tight water distribution carrier, filter and insulating liner between said roof and the sprouting legumes.

7. In a method of growing leguminous sprouts, placing a layer of legumes on a spouting base within a closed chamber, disposing over the legumes a layer of material having sponge characteristics and affording an insulation as well as a filter and a water distribution carrier in such relation as to be engaged by growing sprouts thrusting upwardly from said base, introducing water into the chamber through said layer to afford a high humidity atmosphere within the chamber and thereby forcing the legumes to sprout and grow, and continuing growth of the sprouts until they thrust upwardly against said layer and displace the layer upwardly.

(References on following page)

References Cited in the file of this patent

UNITED STATES PATENTS

| | | |
|---|---|---|
| 866,989 | Twamly | Sept. 24, 1907 |
| 1,031,771 | Buttschau | July 9, 1912 |
| 1,038,407 | McFarlin | Sept. 10, 1912 |
| 1,045,816 | Coy | Dec. 3, 1912 |
| 1,063,742 | Schultz | June 3, 1913 |
| 1,396,235 | Renstrom | Nov. 8, 1921 |
| 2,023,270 | Fischer | Dec. 3, 1935 |
| 2,296,849 | Hammerstrom | Sept. 29, 1942 |
| 2,457,841 | Smith | Jan. 4, 1949 |
| 2,750,713 | Chin | June 19, 1956 |
| 2,810,988 | Chin | Oct. 29, 1957 |

FOREIGN PATENTS

| | | |
|---|---|---|
| 1,087,158 | France | Aug. 18, 1954 |
| 29,009 | Germany | Oct. 4, 1884 |
| 173,494 | Germany | July 30, 1906 |
| 12,019 | Great Britain | of 1902 |

OTHER REFERENCES

Yates: "Seed-Setting in Subterranean Clover . . ." published September 1957 in Australian Journal of Agricultural Research, Vol. 8, No. 5, pages 433 through 443.